April 8, 1969   N. PETERS   3,437,895

ROTATIONAL POSITIONING SYSTEM FOR ELECTRIC MOTORS

Filed Dec. 8, 1965

INVENTOR.
NICHOLAS PETERS

BY

ATTORNEY

United States Patent Office 3,437,895
Patented Apr. 8, 1969

3,437,895
ROTATIONAL POSITIONING SYSTEM FOR ELECTRIC MOTORS
Nicholas Peters, P.O. Box 401, 15 Lorelei Drive, Yorktown Heights, N.Y. 10598
Filed Dec. 8, 1965, Ser. No. 512,429
Int. Cl. H02p 1/22, 1/40, 3/20
U.S. Cl. 318—33                             13 Claims

ABSTRACT OF THE DISCLOSURE

Motor 18 (FIG. 1) is energized through a selected brush member 20 to produce rotation until rotation of commutator 10 centers dwell segment 24 beneath selected brush 20. As dwell segment 24 approaches the centered position, an auxiliary commutator contact 43 engages brush 20 to complete a shunt circuit (44, 45, 34, 32) across motor 18.

---

Figure 1:
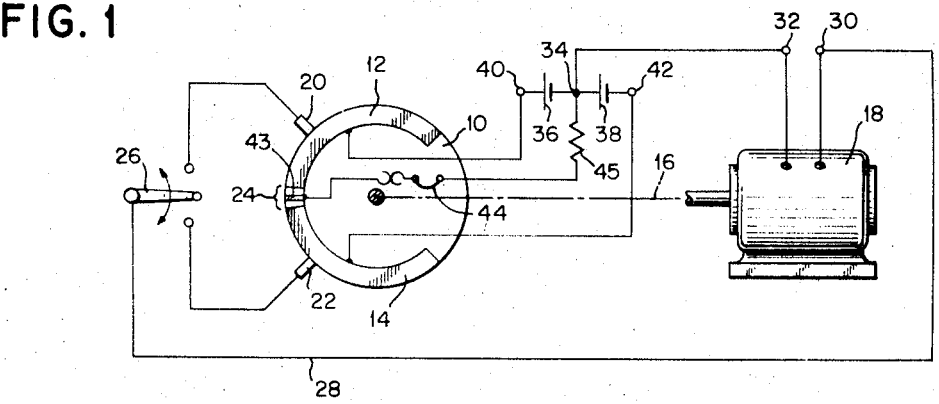

This invention relates to electrically controllable physical positioning systems, and more particularly to electrically controllable positioning systems which are characterized by simplicity of construction, precision in operation, low standby power requirements, stability of operation, and a step-wise deceleration as a selected position is approached.

Many electrically controllable positioning systems have been devised in the past for accomplishing various positioning functions such as for remotely controlling the aim of guns, remotely indicating various measurements, remotely and electrically positioning the controls of various vehicles, remotely operating electrical selector switches, and for many other purposes. Such systems are sometimes referred to generally as positioning servo systems.

Many problems have been encountered in the design and production of electrical positioning systems of prior construction. Frequently, they have been very complex in construction and consequently very expensive and often bulky in physical dimensions. Furthermore, with the prior systems, when a desired position is achieved, considerable power consumption is often required to simply maintain the system in the desired position.

Accordingly, it is an object of the present invention to provide an electrically controllable positioning system which is characterized by simplicity rather than complexity.

It is another object of the present invention to provide electrically controllable positioning systems which are particularly characterized by low cost of construction in relation to the quality of performance.

Another object of the present invention is to provide electrically controllable positioning systems which are characterized by extremely low standby power drain when holding the desired position.

Another important problem in prior electrical positioning systems has been to obtain sufficient precision in the positioning operation. This problem has been particularly accentuated in the presence of adverse conditions such as increases in friction and other variations in the load or the forces resisting the positioning operation.

Accordingly, it is another object of the present invention to provide electrically controlled positioning systems which are characterized by a very high precision in operation in the face of adverse conditions such as high load friction and high forces resisting positioning, even though such forces may vary.

Another object of the invention is to provide an improved electrical positioning system which is characterized by a high precision in the positioning operation without resort to mechanical position locking devices such as detents and the like.

Another object of the invention is to provide a positioning system which is particularly characterized by high speed and reliability in operation.

Another object of the invention is to provide a positioning system which is characterized by a high degree of stability in operation, and which is free from unstable recycling or hunting malfunctions.

In carrying out the above objects of this invention in one preferred form thereof, there may be employed a commutator movable with the object to be positioned and having at least two commutator segments separated by at least one insulated dwell segment. At least two brush contacts are provided in engagement with the commutator. A selector switch is provided to make a power connection selectively to one of said brushes, and the control for a positioning motor is connected from said brush through the commutator segments. The sense of the connections of the commutator segments is such that the energization of the motor through a commutator segment from a brush in engagement with that segment is in a direction to move the commutator in a direction to position the adjacent dwell segment under the selected commutator brush. In this way, the position of the object to be positioned is established by the positioning of the commutator with the dwell segment at the brush, and the positioning motor is de-energized by the disconnection of the brush from the commutator segments at the dwell segment. An auxiliary contact is provided which is movable with the commutator and which is operable as the dwell segment approaches a centered position at the selected brush member to complete an auxiliary circuit to reduce the torque of the motor, and to thereby promote stable operation of the system.

Other features, objects, and advantages of the invention will be apparent from the following description and the accompanying drawings which are as follows:

FIG. 1 is a schematic diagram of a preferred form of the present invention.

Figure 2:
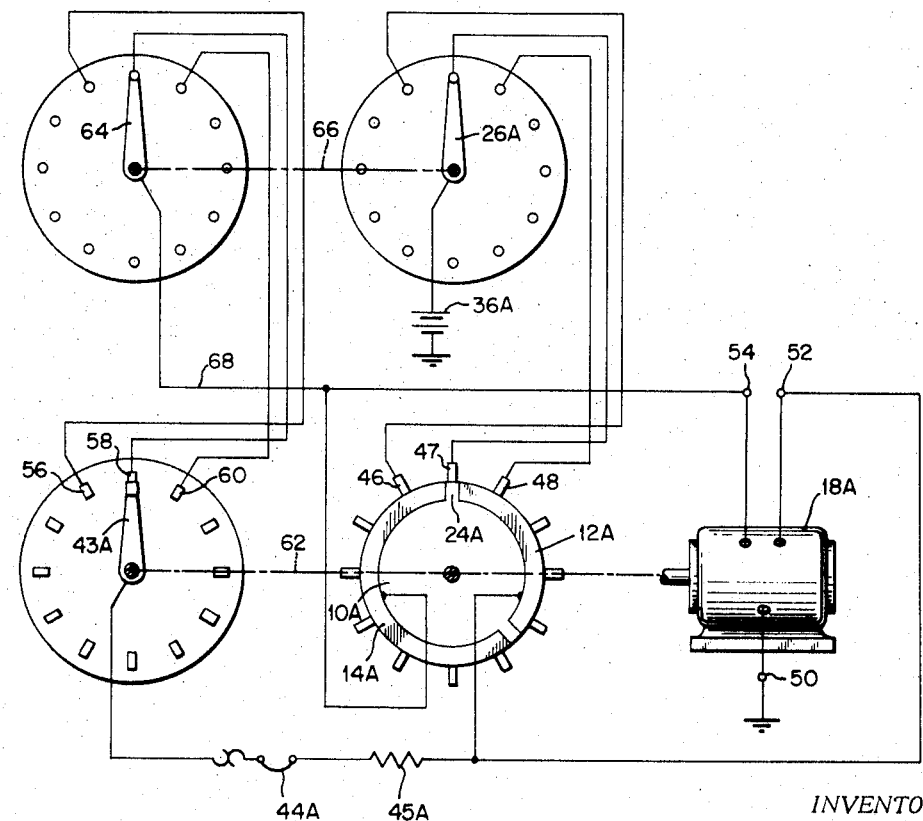

And FIG. 2 is a schematic diagram of an alternative embodiment of the invention employing a reversible motor and illustrating a system which is operable to three or more different positions.

Referring particularly to FIG. 1, there is shown a rotatable commutator 10 having a set of movable contacts 12 and 14 which constitute commutator contact segments. The commutator 10 is connected for rotation by means of a shaft schematically shown at 16. Shaft 16 constitutes an extension of the shaft of an electric drive motor 18.

A set of fixed contacts consisting of brush contacts 20 and 22 are arranged in engagement with the contact segments 12 and 14 of the commutator 10. Between the contact segments 12 and 14 of the commutator, there is an insulated dwell segment 24. A seelctor switch 26 is provided having an upper connection to brush contact 20, and a lower connection to brush contact 22. The lever of the switch 26 is connected through a circuit 28 to one terminal 30 of the electric motor 18. The other terminal 32 of the motor 18 is connected to the midterminal 34 of a three terminal DC power source schematically illustrated as DC cells 36 and 38. The outer terminals 40 and 42 of the power source 36–38 are respectively connected to the commutator segments 12 and 14.

An auxiliary circuit is provided including an auxiliary commutator contact 43 centered in the dwell segment 24. This auxiliary circuit includes an overload breaker device 44 and a resistor 45 connected in series between the auxiliary contact 43 and the center terminal 34 of the power source 36–38.

In operation, if the selector switch 26 is moved to its upper position to complete the circuit to the brush contact 20, then the motor 18 is energized through the brush 20 and the commutator segment 12 from the power source cell 36. The polarity of this energization is such as to cause rotation of the motor 18 in a direction to cause clockwise rotation of the commutator 10, moving the dwell segment 24 to the brush 20. When the dwell segment 24 reaches the brush 20, the energization of the motor through the segment 12 is discontinued by reason of the insulating properties of the segment 24. The dwell segment 24 is slightly wider than either of the brushes 20 or 22, so that neither of the brushes 20 or 22 ever overlaps the two contact segments 12 and 14. If the motor continues to rotate (by coasting) even though it has been de-energized by the disconnection of the segment 12 from the brush 20, then the segment 14 will connect with brush 20. This will apply a reverse voltage from the power source cell 38 through the brush 20 to the motor 18. Thus, the torque and the rotation of the motor 18 will reverse to bring the commutator dwell segment 24 back to the brush 20. If the combination of the commutator 10 and the rotor of the motor 18 have a high inertia and low friction, the dwell segment 24 can conceivably overshoot the position of the brush 20 again in a counterclockwise direction. This will again cause energization through segment 12 for clockwise rotation to finally center the dwell segment 24 under the brush 20. Thus, it is apparent that there is always an automatic and dynamic correction for a position error in either direction. As the dwell segment 24 approaches a centered position under the brush 20, the brush 20 first bridges across from the commutator segment 12 to the auxiliary commutator contact 43. This immediately places the auxiliary circuit including the resistor 45 in parallel with the power source represented by cell 36, and also in parallel with the motor 18. This additional load on the power source decreases the voltage of the power source as seen by the motor 18 and thereby reduces motor torque and causes the motor to commence to slow down. This is very desirable in order to promote stability of the motor in stopping and centering the dwell segment 24 at the brush 20. It is postulated that the power source is one having an appreciable internal impedance.

As soon as the dwell segment 24 is accurately centered under the brush 20, power is no longer connected through either of the segments 12 or 14. Thus, while brush 20 may remain connected to auxiliary contact 43, it no longer bridges to segment 12 so that the resistance 45 is no longer across the power supply.

If the selector switch 26 is moved to its lower contact, completing the circuit to brush 22, then the motor 18 will be energized for counterclockwise rotation to bring the dwell segment 24 under the brush 22. The operation on any overshoot is just as described above. Thus, any energization through segment 14 causes counterclockwise rotation, and any energization through segment 12 causes clockwise rotation to move the dwell segment 24 to the energizing brush 20 or 22.

From the above description, it is apparent that the system of FIG. 1 is a positioning system having two selectable positions corresponding to the positions of the brush contact members 20 and 22.

FIG. 2 shows another embodiment of a positioning system in accordance with this invention which employs three or more fixed brushes 46, 47, and 48 which respectively determine different rotational positions. Parts of the system of FIG. 2 which correspond to those shown in FIG. 1 are identified by similar numbers with the added suffix letter A. In the embodiment of FIG. 2, rather than having a three terminal reversible power source, the motor 18A is a three terminal reversible motor. Motor 18A has a central terminal 50 and end terminals 52 and 54. Energization of the motor between the central terminal 50 and the end terminal 52 causes clockwise rotation, and energization between the intermediate terminal 50 and the end terminal 54 causes counterclockwise rotation. The use of a three terminal reversible motor with a two terminal power supply, as shown in FIG. 2, is preferred over the use of a two terminal motor and a three terminal power supply, as shown in FIG. 1, for various reasons which will be elaborated upon below.

The two terminal power supply 36A of FIG. 2 is permanently connected to the center terminal 50 of motor 18A through ground, and the other side of this power supply 36A is connected through a selector switch 26A to the brushes 46, 47, and 48. The operation of the selector switch 26A always causes the application of voltage to only one of the brushes 46, 47, and 48, and in each case, the motor 18A and the commutator 10A thus are caused to rotate in a direction to position the dwell segment 24A beneath the energized brush.

In the embodiment of FIG. 2, the auixilary circuit is connected across the motor terminals 52 and 54, and the auxiliary circuit contact 43A is provided with its own fixed contacts 56, 58, and 60 which correspond in position to commutator brushes 46, 47, and 48 respectively. The auxiliary conact 43A is mechanically linked, through the schematically indicated shaft 62, for rotation with the commutator 10A. The auxiliary circuit also includes an auxiliary selector switch 64 mechanically interconnected through a shaft indicated schematically at 66 for rotation with the selector switch 26A. The auxiliary selector switch, through its fixed contacts, establishes connections to the auxiliary fixed contacts 56, 58, and 60 corresponding to the connections established by selector switch 26A with the commutator brushes 46, 47, and 48. Thus, the switching function of the auxiliary contact 43A as the dwell segment 24A approaches a selected brush is quite similar to the switching function accomplished by auxiliary contact 43 in FIG. 1. Although the brushes 46, 47, and 48 do not bridge across to any contact 43, the widths of the fixed contacts 56, 58, and 60, and of the auxiliary contact 43A are selected so that the auxiliary contact circuit is completed at a time similar to that which would be accomplished with the bridging action described in connection with FIG. 1. However, it will be appreciated that with the independent switching arrangement illustrated in FIG. 2, the contact 43A may, if desired, close the auxiliary circuit earlier than the bridging action of FIG. 1 would have provided. This may be desirable with fast systems which require additional stabilizing action.

From an inspection of the auxiliary circuit arrangement of FIG. 2 and the above explanation, it is apparent that the auxiliary circuit of FIG. 2 provides a reverse torque at a reduced value to counteract the forward torque of the motor. For instance, if the selected commutator brush is brush 48, then as the dwell segment 24A approaches brush 48 by clockwise rotation of commutator 10A and motor 18A, the auxiliary contact 43A will close to its fixed contact 60. This will complete the auxiliary circuit from the power supply 36A, through the brush 48, and the commutator segment 12A to the motor terminal 52, through resistor 45A, and breaker 44A, through the auxiliary contact 43A, the fixed contact 60, the auxiliary selector switch 64, and back through a connection 68 to the terminal 54 of motor 18A. This energizes the counterclockwise windings of the motor 18A with a voltage which is reduced by means of the auxiliary circuit resistor 45A. The result is to subtract the counterclockwise torque from the clockwise motor torque to produce a reduced net torque from the motor 18A. This slows the motor down preparatory to stopping with the dwell segment 24A centered under the brush 48. When the centered position is achieved, the power source 36A is thereby disconnected from both terminals of the motor 18A, but the auxiliary circuit including the resistor 45A continues connected across the motor terminals 52 and 54 to assist in the collapse of the motor field and the stopping of the motor.

The systems of the present invention are particularly useful with very small direct current motors such as are often used instruments and systems which must be restricted in size and weight. Such motors may measure about one inch to one and one-quarter inches in outside diameter, and one and one-half to two inches in length.

A permanent magnet may be employed as the motor armature. Motors of this type are commonly available from various suppliers such as Barber-Colman Company of Rockford, Illinois under their product identification codes BYLM, FYLM, DYLM, EYLM, GYLM, HYLM, BYQM, and HYQM. These motors may be constructed for operation at DC voltages of 30 volts or less.

A preferred form of three terminal reversible motor for use in systems of the present invention such as shown in FIG. 2, is the motor which forms a portion of the subject matter described and claimed in my co-pending United States patent application Ser. No. 303,758 filed Aug. 22, 1963, now U.S. Patent 3,376,575.

The systems of the present invention are also very useful with motors of larger sizes. Reversible alternating current motors may also be employed instead of DC motors.

In the systems of both FIGS. 1 and 2, it is understood that there is some useful load to be positioned which is connected for movement by the motor 18 or 18A. The desired positions of the load in each case are represented by the positions of the brush contacts 20 and 22 or 46, 47, and 48. However, for the sake of simplicity in the drawings, the loads are not illustrated.

It is to be observed that in the embodiment of both FIGS. 1 and 2, in addition to the brush which is positioned over the insulated dwell segment of the commutator at each commutator position, there is always another brush which is positioned in contact with a conductive commutator segment, and which may be selected by means of the selector switch so as to cause rotation of the positioning motor to a new position corresponding to the newly selected brush.

In both FIGS. 1 and 2, the brushes 20, 22, 46, 47, and 48 are illustrated as radial contact brushes for purposes of clarity. However, for commutator disks 10 and 10A as shown in these embodiments, it is actually more practical to have brushes which make contact in an axial direction with the faces of the segments 12, 14, 12A, and 14A. It is entirely feasible, of course, to construct the commutators employed in the systems of the present invention in the form of drums as well as disks. Where drums are used, radial contact brushes are used. It is also entirely feasible to employ a stationary commutator disk or drum, and to move the brushes as a set of movable contacts supported on a yoke. Such modification is desirable in some instances. Generally, however, it is preferable to use fixed brushes and movable commutators so that no accommodation is necessary for the physical movement of the wired connections to the brushes. As a matter of fact, the permanent connections from the segments 12 and 14 shown in FIG. 1 to the power source terminals 40 and 42 are preferably carried out by means of brushes so as to avoid the problems of moving wired connections. Similarly, the connections from segments 12A and 14A in FIG. 2 to the end terminals 52 and 54 of the motor 18A are preferably carried out by means of brush contacts on the segments.

While only three brush positions have been shown completely wired in the system of FIG. 2, it is quite apparent that almost any desired number of brushes may be provided to thereby provide for many different selected positions.

In either embodiment of the apparatus of the present invention, it is generally intended that, even after the motor torque is reduced by completion of the auxiliary circuit, the remaining torque is nevertheless quite sufficient for starting and moving the anticipated load into the precisely centered position as determined by the dwell segment. However, there may be unpredictable situations of temporary mechanical overloads on the system such that the reduced torque is not sufficient to achieve the centering operation desired. Under such conditions, a substantial current may continue to flow through the auxiliary circuit as well as through the power source and the motor, possibly resulting in ultimate damage to the equipment. It is for this purpose that the automatic interruptor device 44 is provided. This device is preferably selected and adjusted so as to trip open the auxiliary circuit in case of prolonged energization of the auxiliary circuit. For this purpose, and in order to obtain a delayed operation, it is preferable that the interruptor device 44 be thermally operated. It may consist of a standard thermo-statically operated breaker which automatically recloses after a brief period of opening. The breaker may be operable in response to a continued current in the auxiliary circuit, as schematically illustrated in the drawings for both FIGS. 1 and 2, or it may be designed for actuation in response to an overload condition in the main connections of the power supply. In either case, it is preferred that the circuit which is interrupted is the auxiliary circuit including the resistor 45. Thus, when the auxiliary circuit is opened, full torque is automatically restored to the motor 18 to achieve perfect centering of the device. Under heavy load conditions, and starting from a position which is almost centered, there is virtually no risk of instability, even though full torque is applied. After a time, the breaker 44 automatically recloses so that normal system operation is restored.

The present invention constitutes an improvement over the invention described and claimed in my co-pending patent application, Ser. No. 390,979, filed Aug. 20, 1964, now U.S. Patent 3,395,323, and entitled Electrical Positioning System. While only two embodiments are illustrated in the present specification, it will be quite apparent that the features of the present invention may be incorporated in many other similar systems such as exemplified by the various different embodiments of positioning systems shown in that prior patent application.

While the systems of the prior invention are stable for many configurations, it has been discovered that there are numerous conditions under which instability is encountered. This has been particularly true where there is mechanical lost motion in the drive train between the positioning motor and the commutator. Many other conditions may promote instability, such as high inertia loads. Accordingly, the present invention provides even greater stability in operation and avoids the undesired condition of "hunting," or mechanical oscillation about the centered position. It also helps to avoid any condition of overshoot of the selected position by slowing down the positioning motor as the centered position is approached. Accordingly, for some conditions the present improvement invention is absolutely vital to the successful operation of the system.

The commutators of the present invention may be formed in many different physical configurations and by many different methods. The circular configurations may be formed on a surface of a cylinder or cone, or on an axial face of a disk. When the commutator is formed on a flat surface, the structure may be very conveniently formed by photographic circuit techniques which are well known. In accordance with these methods, it is simply necessary to produce a clear drawing of the patterns of conductive surfaces which are desired, and then to proceed with the photographic steps.

The illustrated embodiments of this invention are operable to accomplish a position change in response to a single shift in the position of a single pole switch member. It is quite apparent that this switching function can be provided not only by mechanical switching members, as illustrated, but also by electronic multistable circuits, such as are commonly referred to as "Flip-Flop" circuits, and which are extensively used in digital computers and other control and logic circuits. Thus, the output of the systems of the present invention can be an output which is controlled by computer logic.

Various speed changing gear arrangements may be incorporated in systems according to the present invention, between the motor and the load device to be positioned. It is particularly advantageous to have the commutator disk closely associated with the load device to be positioned so as to accomplish precise positioning of the load despite possible lost motion in any gearing or drive connections to the motor. However, it is also possible, and often desirable, to have the commutator disk in a high speed part of the system, and to couple the commutator disk to the object to be positioned through speed-reducing gears. The speed of the commutator disk in such a system may be the same as the speed of the motor, or it may be somewhat different from the speed of the motor. In either case, the higher speed of the disk provides a vernier effect to increase the accuracy of positioning of the load device by reason of the amplification of motion of the commutator disk.

Each of the embodiments of the present invention discussed above have been related to the direct connection of a power source to an electric motor through the commutator embodied in each system of the invention. This assumes necessarily that the motor is small in size and low in power, particularly, if the commutator is formed by printed circuit techniques involving thin conductive film commutator segments. As a matter of fact, the present invention is particularly useful with the very small motors such as were described above and haivng horsepower ratings in the range below one-tenth of a horsepower, and often in the order of one-twentieth of a horsepower and less.

However, it is quite apparent that power amplifying apparatus of various kinds may be employed in the systems of the present invention between the commutator brushes and the motor. Thus, electronic amplifiers, relays, and heavy industrial contactors may be provided singly, or in cascade connections, to build up the steps of amplification to control electrical positioning motors of almost any size which is desired. For instance, it is possible to control the positioning of the rudder of a full size naval vessel by means of one of the positioning systems of the present invention, with suitable amplification in the motor circuit.

Furthermore, once it is appreciated that it is feasible to provide some form of amplification in the motor circuit, it is obvious that it is not absolutely necessary that the output motor must be an electrical motor. For instance, the amplifier in the motor circuit may consist of an electro-magnetically operable hydraulic control valve, and the output motor may then be a hydraulically operable positioning motor. As another alternative, the system may operate through the medium of electrically operable clutches to selectively obtain rotation in either one direction or the other for the output shaft.

In connection with the above observations, it is quite apparent that translational, as well as rotational motors may be employed in positioning systems in accordance with the present invention. Furthermore, the commutator structure itself may be arranged for translational rather than rotational movement.

The descriptions of the various embodiments of the invention have been given in terms of a moving commutator, with moving contact segments cooperating with fixed contact brush members. However, it is obvious that the commutator segments may be fixed and the brush members may be movable with relation to the commutator while supported by a yoke arrangement. Also, for certain control functions, it may be desirable to have both the commutator and the brushes movable. The main requirement is that provision must be made for relative movement between the brushes and the commutator.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

What is claimed is:

1. In a positioning system, a plurality of electrical contact brush members, segmented electrical contact means forming a commutator for cooperation with said brush members, an electrically controlled motor rotor mechanically connected for movement with said commutator, said commutator including at least one insulated dwell segment between adjacent ones of said electrical contact segments, said contact segments adjacent to said dwell segment being electrically connected respectively for controlling forward and reverse motion of said motor when control power is applied through a selected one of said brush members to thereby move said dwell segment to a centered position at said selected brush member, said dwell segment having a width greater than said selected brush member to disconnect said brush member from said contact segments when said dwell segment is moved to said centered position at said selected brush member, another one of said brush contact members being positioned on one of said commutator segments when said dwell segment is positioned under said selected brush member, an auxiliary circuit contact movable with said commutator, said auxiliary circuit contact being operable as said dwell segment approaches a centered position at the selected brush member and before disconnection of said brush member from said contact segment to complete an auxiliary shunt circuit across said motor which is operable to reduce the torque of said motor.

2. A positioning system in accordance with claim 1 in which said auxiliary circuit remains connected across said motor after said dwell segment is finally positioned directly under said selected brush member in order to promote the collapse of the motor field and stopping of the motor.

3. A positioning system in accordance with claim 1 in which there is provided a first selection switching means for establishing a connection to the selected one of said brush members.

4. A positioning system as set forth in claim 1 in which said auxiliary circuit includes a current limiting resistor.

5. A positioning system in accordance with claim 1 in which the reduced torque of said motor after completion of said auxiliary circuit is sufficient to start and move the load connected to the motor to thereby achieve the centered position of said dwell segment under said selected brush member.

6. A positioning system as set forth in claim 1 in which there is provided a circuit interruptor means in series in said auxiliary circuit and operable upon a sustained overload condition therein to open said auxiliary circuit and to thereby restore full torque to said motor.

7. A positioning system in accordance with claim 6 in which said circuit interruptor is operable to automatically reclose in a brief period after interruption.

8. A positioning system in accordance with claim 6 in which said circuit interruptor is a thermal breaker device operable in response to heat generated by the overload circuit.

9. A positioning system in accordance with claim 3 which is arranged for connection to a three terminal direct current voltage source, said adjacent commutator segments being arranged to be connected to the outer terminals of said three terminal voltage source, and said auxiliary circuit being arranged to be connected from the mid-terminal of said three terminal voltage source to said auxiliary circuit contact means, said motor being connected from the center terminal of said three terminal power supply to said first selection switching means.

10. A positioning system in accordance with claim 9 in which said auxiliary contact means comprises a conductive segment centered in said insulated dwell segment and cooperating with said brush members to complete said auxiliary circuit.

11. A positioning system as set forth in claim 3 in which said auxiliary contact means comprises a separate multiple contact switch which is physically and electrically separate from said commutator, but mechanically interconnected for movement therewith.

12. A positioning system in accordance with claim 11 in which said motor is a three terminal motor having a forward terminal, a reverse terminal, and a common terminal, and including a second selection switching means mechanically interconnected with said first selection switching means and operable to select an appropriate fixed contact of said auxiliary contact means corresponding with the position of said selected brush member.

13. A positionin gsystem in accordance with claim 12 in which said auxiliary circuit is completed through said auxiliary contact means and said second selection switching means to thereby complete the auxiliary circuit between said forward and reverse terminals of said motor, said auxiliary circuit remaining closed and effective after said dwell segment is positioned under said selected brush member.

References Cited

UNITED STATES PATENTS

| 2,393,492 | 1/1946 | Yardeny | 318—33 XR |
| 2,455,901 | 12/1948 | Yardeny | 318—31 |
| 2,475,271 | 7/1949 | Yardeny | 318—31 XR |
| 2,720,619 | 10/1955 | James | 318—31 |
| 2,884,581 | 4/1959 | Schunemann et al. | 318—265 XR |

BENJAMIN DOBECK, *Primary Examiner.*

U.S. Cl. X.R.

318—28, 265